US012781794B2

(12) United States Patent
Bodenheimer et al.

(10) Patent No.: US 12,781,794 B2
(45) Date of Patent: Nov. 3, 2026

(54) ROLLING ELEMENT CAGE

(71) Applicant: Accuride International GmbH, Diez (DE)

(72) Inventors: Kai Bodenheimer, Bremberg (DE); Christoph Bonn, Bornich (DE); Andreas Heffel, Dierdorf (DE); Christina Reuter, Burgschwalbach (DE); Desiree Schachner, Waldems (DE)

(73) Assignee: ACCURIDE INTERNATIONAL GMBH, Diez (DE)

( * ) Notice: Subject to any disclaimer, the term of this patent is extended or adjusted under 35 U.S.C. 154(b) by 125 days.

(21) Appl. No.: 18/405,267

(22) Filed: Jan. 5, 2024

(65) Prior Publication Data

US 2024/0229864 A1 Jul. 11, 2024

(30) Foreign Application Priority Data

Jan. 6, 2023 (DE) ..................... 10 2023 100 253.8

(51) Int. Cl.
*F16C 29/04* (2006.01)

(52) U.S. Cl.
CPC ............ *F16C 29/04* (2013.01); *F16C 29/048* (2013.01)

(58) Field of Classification Search
CPC ...... F16C 29/04; F16C 29/045; F16C 29/046; F16C 29/048; F16C 33/3887; F16C 33/422; A47B 88/487; A47B 88/493
(Continued)

(56) References Cited

U.S. PATENT DOCUMENTS 3,488,097 A 1/1970 Fall
3,904,254 A * 9/1975 Hagen .................. F16C 29/048 312/334.47
(Continued)

FOREIGN PATENT DOCUMENTS

AT 218311 B 11/1961
CN 113623316 A 11/2021
(Continued)

OTHER PUBLICATIONS

Translation of DE102017123093 obtained Jul. 5, 2025.*
(Continued)

*Primary Examiner* — James Pilkington
(74) *Attorney, Agent, or Firm* — MEDLER FERRO WOODHOUSE & MILLS PLLC

(57) ABSTRACT

A rolling element cage for a linear guide system includes two receiving portions and a connecting portion connecting the two receiving portions. Each of the two receiving portions includes two extended top surfaces. The two receiving portions each include a plurality of apertures. Each aperture includes a side surface connecting the two top surfaces. At least one of a plurality of bearing rolling elements is receivable in each of the plurality of apertures of the rolling element cage, so that the side surface of the aperture or a transition between one of the two top surfaces and the side surface can be brought into contact with a rolling element surface of the bearing rolling element which is receivable in the aperture. The transition between one of the two top surfaces and the side surface includes, at least in sections, a broken edge, an edge including a chamfer or a rounding.

15 Claims, 6 Drawing Sheets

(58) Field of Classification Search
USPC ........................................................ 29/898.067
See application file for complete search history.

(56) References Cited

U.S. PATENT DOCUMENTS

| | | | | |
|---|---|---|---|---|
| 5,628,687 | A * | 5/1997 | Genestre | F16D 3/2055 464/122 |
| 6,250,804 | B1 | 6/2001 | Hsu et al. | |
| 2004/0223670 | A1* | 11/2004 | Ramonat | F16C 19/505 384/45 |
| 2006/0159380 | A1 | 7/2006 | Oishi | |
| 2013/0272642 | A1 | 10/2013 | Li et al. | |

FOREIGN PATENT DOCUMENTS

| | | | | |
|---|---|---|---|---|
| DE | 19955039 | A1 | 9/2000 | |
| DE | 19949239 | A1 | 4/2001 | |
| DE | 102017123093 | A1 * | 4/2019 | F16C 33/38 |
| EP | 2481990 | A1 | 8/2012 | |
| JP | 2005256893 | A * | 9/2005 | F16C 33/3887 |
| JP | 2006-200634 | A | 8/2006 | |
| JP | 2007009989 | A * | 1/2007 | F16C 33/545 |

OTHER PUBLICATIONS

Translation of JP2007009989 obtained Jul. 5, 2025.*
Translation of JP2005256893 obtained Jan. 13, 2026.*
German Search Report received for DE Application No. 102023100253.8, mailed on Sep. 29, 2023, 7 pages of Original Document only.
Norm DIN 8589-0 2003-09-00. Fertigungsverfahren Spanen—Teil 0: Allgemeines; Einordnung, Unterteilung, Begriffe (Standard DIN 8589-0 2003-09-00. Machining processes—Part 0: General; classification, subdivision, terms.) p. 8.
European Search Report for EP Patent Application No. 23220489.1, Issued on May 6, 2024, 24 pages (12 pages of English Translation and 12 pages of Original Document).

* cited by examiner

ROLLING ELEMENT CAGE

The application claims priority of German patent application no. 10 2023 100 253.8, filed on Jan. 6, 2023, which is incorporated by reference herein in its entirety.

The present invention relates to a rolling element cage for a linear guide system, wherein the rolling element cage comprises two receiving portions and a connecting portion connecting the two receiving portions, wherein each of the two receiving portions comprises two extended top surfaces, wherein the two receiving portions each comprise a plurality of apertures, wherein each aperture comprises a side surface connecting the two top surfaces, wherein at least one of a plurality of bearing rolling elements is receivable in one of the plurality of apertures of the rolling element cage, wherein the side surface of the aperture or a transition between one of the two top surfaces and the side surface can be brought into contact with a rolling element surface of the bearing rolling element receivable in the aperture.

Furthermore, the present invention also relates to a linear guide system comprising such a rolling element cage.

In addition, the present invention relates to a method for manufacturing a rolling element cage for a linear guide system comprising the steps of: Providing a material section, wherein the material section defines two receiving portions and a connecting portion of the rolling element cage connecting the two receiving portions, wherein each of the two receiving portions comprises two extended top surfaces, wherein the two receiving portions each comprise a plurality of apertures, wherein each aperture comprises a side surface connecting the two top surfaces, and wherein a transition is formed between each of the two top surfaces and the side surface.

Linear guide systems, in particular telescopic rails, comprising at least two rail elements and a rolling element cage with bearing rolling elements accommodated therein for reducing the friction between two rail elements are known from the prior art in a variety of embodiments. They are used in various household appliances, but also in automotive engineering and in many other applications.

When two rail elements move relative to each other, the bearing rolling elements roll on opposing first and second running surfaces of the first and second rail elements. They roll between these first and second running surfaces. The resulting friction is lower than direct sliding friction between the rail elements without bearing rolling elements.

A rolling element cage is used to ensure an even distribution of the bearing rolling elements in the pull-out direction between the running surfaces of two rail elements that move against each other.

The rolling element cage defines a distance between the bearing rolling elements in the pull-out direction.

The linear guidance systems known from the prior art require lubrication with a lubricant in order to enable uniform, low-noise displacement of two rail elements relative to each other. Such lubrication is achieved, for example, by greasing the linear roller bearing formed by the rail elements and the bearing rolling elements.

However, there are always applications that do not allow lubrication with lubricants, for example for hygienic reasons. In addition, there are operating situations, even with linear guide systems comprising a lubricant, in which no lubricant is present yet or no more lubricant is present on the individual bearing rolling elements or the running surfaces of the rail elements. An example of such an operating situation is a linear guide system installed in a pyrolytic oven after pyrolysis.

In contrast, it is an object of the present invention to provide a rolling element cage for a linear guide system in which the noise development during a relative movement of two rail elements against each other is reduced even without an additional lubricant. In addition, it is an object of the present invention to provide a rolling element cage for a linear guide system in which the running and thus the feel of a relative movement of two rail elements against each other is improved even without an additional lubricant.

At least one of the aforementioned objects is solved by a rolling element cage for a linear guide system described below. In this case, the transition between one of the two top surfaces and the side surface of the rolling element cage comprises, at least in sections, a broken edge, an edge comprising a chamfer or a rounding.

In addition, at least one of the aforementioned objects is also solved by a linear guide system. In this case, the linear guide system comprises a first rail element comprising two first running surfaces, a second rail element comprising two second running surfaces, a rolling element cage according to an embodiment of the present invention, and a plurality of bearing rolling elements. At least one of the plurality of bearing rolling elements is accommodated in one of the plurality of apertures of the rolling element cage, wherein the side surface of the aperture or the transition between one of the two top surfaces and the side surface is in contact with a rolling element surface of the bearing rolling element accommodated in the aperture. The rolling element cage positions the plurality of bearing rolling elements between the first running surfaces of the first rail element and the second running surfaces of the second rail element, so that the first rail element and the second rail element are supported against each other in such a way that the first rail element and the second rail element are linearly displaceable relative to each other in and against a pull-out direction.

A rolling element cage usually consists of a flat, extended material, in particular a sheet metal or metal plate.

The material of the rolling element cage can be regarded as an extended material comprising a finite thickness. Therefore, the two top surfaces are formed by the extended surfaces of the material, in particular the sheet metal. In contrast, the side surface of the aperture extends along the thickness of the material and, in an embodiment, substantially perpendicular to the top surfaces.

The apertures are formed in the flat extended material of the cage. A region of the rolling element cage in which a plurality of apertures are located linearly one behind the other, so that the rolling elements accommodated therein are located one behind the other in the pull-out direction and between the same pair of running surfaces of the rail elements, forms a receiving portion. In an embodiment, two receiving portions connected by a connecting portion are angled with respect to the connecting portion. However, in an embodiment, two receiving portions and the connecting portion connecting them lie in one plane. In an embodiment, two receiving portions and the connecting portion connecting them form a curved surface.

In a rolling body cage for a linear guide system, the plurality of apertures of each receiving portion for receiving the rolling elements lie on a straight line so that, during operation of the rolling body cage, the axes of rotation of the rolling elements align substantially perpendicular to the straight line or are aligned substantially perpendicular to the straight line.

In an embodiment, the apertures are located at an edge of the flat extended material and are open there. In an embodiment of the invention, the side surface of each aperture in a cross-sectional plane parallel to one of the top surfaces has a shape modelled on the Greek capital letter omega. In an alternative embodiment, the aperture is completely surrounded by the flat, extended material of the rolling element cage. In an embodiment of the invention, the side surface of each aperture then has an approximately circular shape or a polygonal shape in a cross-sectional plane parallel to one of the top surfaces.

By removing the material of the rolling element cage in the area of the apertures, the apertures each comprise a side surface which has a height which is essentially equal to the thickness of the material of the rolling element cage. Where the side surface and the respective top surface intersect, they form an edge comprising an angle of approximately 90 degrees in the prior art.

The contact between the respective bearing rolling element and the rolling element cage occurs primarily at this edge. According to the invention, this sharp edge at the transition between one of the top surfaces and the side surface of the aperture is replaced by a transition comprising, at least in sections, a broken edge, an edge comprising a chamfer or a rounding.

The present invention is based on the idea of optimising the acoustic properties of a linear guide system with bearing rolling elements guided in a rolling element cage between two first and second rail elements that can be moved relative to each other, even without an additional lubricant. This primarily prevents or reduces squeaking of the rail without lubricant. In addition, a smooth running of the rail is achieved and a more pleasant feel is provided for the user when operating the linear guide system.

According to the invention, the noise development is optimised by purely constructive mechanical measures. The invention is based on the finding that the primary cause of noise development, in particular the generation of a squeaking noise, is the contact between a bearing rolling element and the rolling element cage. The solution according to the invention is based on avoiding or at least minimising the sharp edge that is at least partly responsible for the squeaking.

In an embodiment, both edges, which are formed by the side surface of the aperture with the two opposing top surfaces of the rolling element cage in the prior art, are each replaced, at least in sections, by a transition comprising a broken edge, an edge comprising a chamfer or a rounding. In an alternative embodiment, only the edge of the prior art coming into contact with the rolling element accommodated in the aperture is replaced by a transition comprising a broken edge, an edge comprising a chamfer or a rounding.

In order to avoid a sharp edge between the respective top surface of the rolling element cage and the side surface of the aperture and to provide a transition between the top surface and the side surface, there are a variety of possibilities.

In an embodiment of the invention, the transition between one of the two top surfaces and the side surface is formed by machining, for example by milling a chamfer in the area of the transition between the top surface and the side surface.

In an embodiment of the invention, the rolling element cage is obtainable by a method comprising blasting the rolling element cage with compressed air with a solid blasting medium, for example sand or dry ice. Such compressed air blasting of the rolling element cage results in the originally substantially right-angled edges being broken or rounded.

According to a further embodiment of the invention, the rolling element cage is obtainable by a method comprising vibratory grinding of the rolling element cage. Vibratory grinding of the rolling element cage also results in the originally essentially right-angled edges being broken or rounded.

Vibratory grinding is a separating method for surface machining, in particular of metallic workpieces, i.e. in this case rolling element cages. The workpieces to be machined are placed in a work container as bulk material comprising abrasive media and optionally an additive in an aqueous solution. An oscillating or rotating movement of the work container creates a relative movement between the workpiece and the abrasive media, which causes material to be removed from the workpiece, particularly from its edges. The method is defined in DIN 8589 and is called vibratory finishing. Vibratory grinding is also frequently referred to as Trowalising (registered trademark; after the company Walter Trowal). In particular, vibratory grinding leads to edge rounding.

According to one embodiment of the invention, the rolling element cage is obtainable by a method comprising embossing the transition between the side wall surface and the top surface with a forming tool so that a rounding is formed, wherein a course of the rounding is predetermined by a shape of the forming tool, or by a chip removing method.

In an embodiment of this kind, it is expedient if a sheet metal, of which the rolling element cage preferably consists, is embossed with the forming tool in the area of the apertures after the apertures have been punched or cut and before bending.

The aforementioned process steps for forming the transition according to the invention between at least one of the two top surfaces and the side surface presuppose that the apertures have already been formed in the material of the rolling element cage prior to these steps.

In an embodiment of the invention, a method for obtaining the rolling element cage comprising one of the steps described above for chamfering, breaking or rounding the edges, includes punching or cutting a sheet metal so that the apertures are formed and bending so that the receiving portions are angled relative to the connecting portion or portions.

In an embodiment of the invention, a method for obtaining the rolling element cage comprises investment casting instead of a method comprising punching or cutting and bending.

For noise reduction of the entire linear guide system, it is already sufficient if a single aperture comprises the transition according to the invention between one of the two top surfaces and the side surface. In an embodiment, however, this condition is fulfilled for a plurality, preferably all, of the plurality of apertures.

A rolling element is understood to be a body of rotation which, as an element of a rolling bearing, significantly reduces the friction between two rail elements and thus facilitates relative movement of the two rail elements with respect to each other. Rolling elements are, for example, balls, rollers, barrels, needles or cones. In an embodiment of the present invention, the rolling elements are balls. It is understood that in this case the rolling element cage is a ball cage.

According to an embodiment of the invention, exactly one rolling element is located in each aperture. However, there are also embodiments in which more than one rolling element is located in a single aperture. In one such embodiment, for example, two rolling elements are spaced apart in the same aperture by a spacer comprising or consisting of a lubricant.

In one embodiment of the invention, the rolling element cage is made of a material selected from a group consisting of sheet metal, sheet steel, aluminised sheet steel, stainless steel and plastic.

In an embodiment of the invention, the cage is made of a material which is at least heat-resistant or food-safe.

In an embodiment of the invention, the rolling element cage is made of a material that is softer than a material of the bearing rolling elements, in particular softer than a material of which the bearing rolling elements are made.

In an embodiment of the invention, the rolling element cage is made of brass or bronze. Brass and bronze are examples of materials which are softer than the typical material of the bearing rolling elements, for example steel.

In the present application, those rolling elements of the linear guide system are referred to as bearing rolling elements which, during operation, transfer loads from the first rail element to the second rail element or vice versa. In an embodiment of the invention, the bearing rolling elements are manufactured from steel.

According to an embodiment of the present invention, at least one of the plurality of bearing rolling elements is a ball, wherein the ball comprises a plurality of planes of symmetry, wherein the plurality of planes of symmetry include a straight line extending through the centre of the ball and perpendicular to the pull-out direction, wherein either the chamfer in at least one of the plurality of planes of symmetry is straight, convexly curved or concavely curved, or the rounding in at least one of the plurality of planes of symmetry is convexly curved or concavely curved.

In an embodiment, the chamfer is straight in a plurality of the previously defined planes of symmetry, preferably in all of the previously defined planes of symmetry, is convexly curved or is concavely curved. In one embodiment, the rounding is convexly curved or concavely curved in a plurality of the planes of symmetry, preferably in all planes of symmetry.

In an embodiment, the concave or convex curvature is continuous. This means that the radius of curvature does not change or only changes continuously. In this way, the formation of edges, which can result in noise, is avoided.

In other words, in such an embodiment, the transition between the side surface and the respective top surface has a cross-section that is essentially constant in a circumferential direction. Such an embodiment comprising a cross-sectional profile that does not change in the circumferential direction of the aperture and thus of the bearing rolling element or ball can be achieved in various ways.

According to an embodiment of the invention, the material of the rolling element cage, in particular a sheet metal of the rolling element cage, has a thickness, wherein the chamfer or the rounding comprises a radius of curvature, wherein the radius of curvature is equal to the thickness of the rolling element cage, preferably ½ or smaller, preferably ¼ or smaller and particularly preferably ⅕ or smaller of the thickness of the rolling element cage.

In an alternative embodiment, the radius of curvature is larger than the thickness of the rolling element cage.

In an embodiment of the invention, the rolling element cage comprises exactly two receiving portions, so that the rolling element cage guides rolling elements between exactly two first running surfaces of the first rail element and exactly two running surfaces of the second rail element. In this case, the first running surfaces of the first rail element are located opposite the second running surfaces of the second rail element in pairs. In an embodiment of the invention, the rolling element cage comprises a substantially U-shaped or C-shaped cross-section in a direction perpendicular to the pull-out direction. This cross-section is formed by the two receiving portions and a connecting portion connecting these two receiving portions, wherein the two receiving portions are each angled relative to the connecting portion along an edge extending in the pull-out direction, in particular a bending edge. In such an embodiment, the connecting section forms a cage back of the rolling element cage. In such an embodiment, the receiving portions are also referred to as receiving legs.

In an embodiment, each of the plurality of apertures is arranged in such a way that the respective rolling element cannot fall through the aperture. If the rolling elements are balls, a minimum dimension, preferably a minimum radius of the aperture is smaller than the ball radius.

In an embodiment of the invention, each of the receiving portions is angled along a straight line that intersects all of the apertures. The angling gives each aperture a defined support at which the rolling element comes into contact with the rolling element cage. In addition, in an embodiment of the invention, the angling reduces a minimum dimension, preferably a minimum radius of the aperture such that the respective rolling element cannot fall through. In an embodiment of the invention, not only are the receiving portions bent with respect to the connecting portion so as to form receiving legs, but each of the receiving legs is angled along a straight line intersecting all of the apertures, as described generally above.

In an alternative embodiment of the invention, the rolling element cage comprises more than two, in particular exactly three or exactly four receiving portions. Such a rolling element cage guides rolling elements between more than two first running surfaces of the first rail element and more than two running surfaces of the second rail element. The running surfaces of the first rail element are located opposite the running surfaces of the second rail element in pairs. In an embodiment of this kind, the rolling element cage comprises at least two connecting portions, each of which connects two receiving portions to one another.

In an embodiment of the invention, the rolling element cage comprises a thickness which is at least 5% of the radius of the bearing rolling element and preferably at least 7.5% of the radius of the bearing rolling element. In an embodiment of the invention, the bearing rolling element is a ball, wherein the rolling element cage comprises a thickness which is at least 5% of the radius of the ball and preferably at least 7.5% of the radius of the ball.

The thickness of the rolling element cage is defined as its material thickness. If the rolling element cage is made of sheet metal, the thickness of the rolling element cage is given by the thickness of the sheet metal. It has been found that the larger the thickness of the rolling element cage, the lower the noise generated when the first rail element moves relative to the second rail element.

However, in an embodiment of the invention, the thickness of the rolling element cage is at most 50% of the radius of the bearing rolling element, preferably at most 20% of the radius of the bearing rolling element and particularly preferably at most 15% of the radius of the bearing rolling element. In an embodiment of the invention, the thickness of the rolling element cage is at most 50% of the ball radius, preferably at most 20% of the ball radius and particularly preferably at most 15% of the ball radius.

In an embodiment of the invention, the rolling element cage has a thickness of 0.6 mm or more. In an embodiment of the invention, the rolling element cage has a thickness of 3 mm or less, preferably of 1.5 mm or less and particularly preferably of 1 mm or less.

According to an embodiment of the invention, the linear guide system comprises, in addition to the plurality of bearing rolling elements, a plurality of lubricant rolling elements, wherein the lubricant rolling elements comprise or consist of a lubricant.

The lubricant rolling elements deliver the lubricant to the bearing rolling elements and the rolling element cage during operation of the linear guidance system. They ensure lubrication of the linear rolling bearing. In an embodiment of the invention, the lubricant is graphite. In an embodiment, the plurality of bearing rolling elements is manufactured from a material comprising a larger hardness than the lubricant of the lubricant rolling elements.

In an embodiment of the invention, at least two bearing rolling elements and at least one lubricant rolling element are accommodated in each of the receiving portions of the rolling element cage.

For the lubricant rolling elements, the formation of the transition between one of the two top surfaces and the side surface according to the invention need not necessarily be matched.

In the present application, the pull-out direction refers to the direction in which the first rail element and the second rail element are moved relative to each other in order to move from a first end position to a second end position. In an embodiment of the invention, the first end position is a pull-in position and the second end position is a pull-out position. In the case of a telescopic rail, the retracted position denotes the position of the first and second rail elements relative to each other in which the telescopic rail is fully inserted. The pull-out position then refers to the position of the first and second rail elements relative to each other in which the telescopic rail is pulled out to its maximum extent. Accordingly, a direction opposite to the pull-out direction is the direction in which the first and second rail elements are moved relative to each other in order to return from the second end position to the first end position.

According to the present invention, the linear guide system comprises a first rail element and a second rail element. This does not exclude that the linear guide system, in particular if it is a telescopic rail, comprises further rail elements, in particular three rail elements, for example for providing a 100% extension.

In an embodiment of the invention, at least the first rail element or the second rail element is made of a material selected from a group consisting of sheet metal, sheet steel, aluminised sheet steel and stainless steel.

In an embodiment of the invention, the first rail element and the second rail element each comprise a rail back and running surfaces connected to the rail back, wherein the running surfaces of a rail element face towards or away from each other, depending on the arrangement. In an embodiment, the cross-sectional profile of such a rail element in a cross-sectional plane essentially perpendicular to the pull-out direction is essentially C-shaped.

The term linear guide system is to be understood so generally that it includes not only rails in which the first rail element and the second rail element comprise approximately the same length, i.e. in particular telescopic rails, but also linear guides in which the second rail element is significantly shorter than the first rail element. In an embodiment of the invention, the linear guide system is therefore selected from a group consisting of a pull-out guide, a telescopic rail and a linear guide.

At least one of the aforementioned objects is also solved by a method for manufacturing a rolling element cage for a linear guide system according to the independent claim directed thereto. To this end, a method of the type referred to above additionally comprises the step of machining the transition between one of the two top surfaces and the side surface so that the transition comprises, at least in sections, a broken edge, an edge comprising a chamfer or a rounding.

Insofar as aspects of the invention are described in the following with regard to the manufacturing method, these also apply to the rolling element cage or the linear guide system and vice versa.

Insofar as the rolling element cage or the linear guide system is manufactured comprising a method according to the present invention, it comprises the corresponding features produced thereby. In particular, embodiments of the method are suitable for manufacturing embodiments of the rolling element cage or the linear guide system described above.

According to an embodiment of the invention, the machining of the transition comprises at least one step selected from compressed air blasting the material section with a solid blasting medium, vibratory grinding the material section, embossing the transition between the side wall surface and the top surface with a forming tool so that the rounding is formed, wherein a course of the rounding is predetermined by a shape of the forming tool, and machining the transition between the side wall surface and the top surface. In an embodiment, the method comprises a combination of two or more of said steps.

In an embodiment, providing the material section comprises the steps of: Providing a strip of sheet metal and cutting or punching out the plurality of apertures.

In an embodiment, after cutting or punching out the plurality of apertures, the transition between the side wall surface and the top surface is embossed comprising a forming tool, and after embossing, the receiving portions are bent relative to the connecting portion. In an embodiment, this gives the rolling element cage a U-shaped or C-shaped profile.

In an embodiment, in addition to the bending of the receiving portions with respect to the connecting portion, each of the receiving portions is angled along a straight line that intersects all apertures after embossing. This gives the rolling element cage a C-shaped profile.

In an embodiment of the invention, the rolling element cage produced according to one of the embodiments of the method described above is assembled together with a first and a second rail element and a plurality of rolling elements to form a linear guide system.

Further advantages, features and possible applications of the present invention become apparent from the following description of an embodiment and the associated figures. In the figures, like elements are designated by identical reference numbers.

Figure 1:
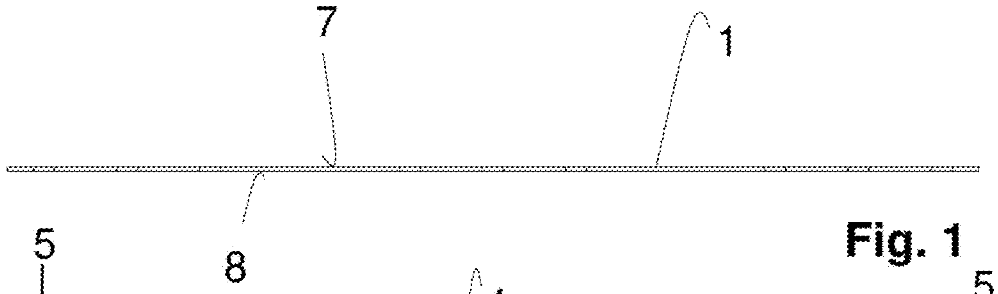
FIG. 1 is a side view of a sheet metal strip for a ball cage according to an embodiment of the present invention.
Figure 2:
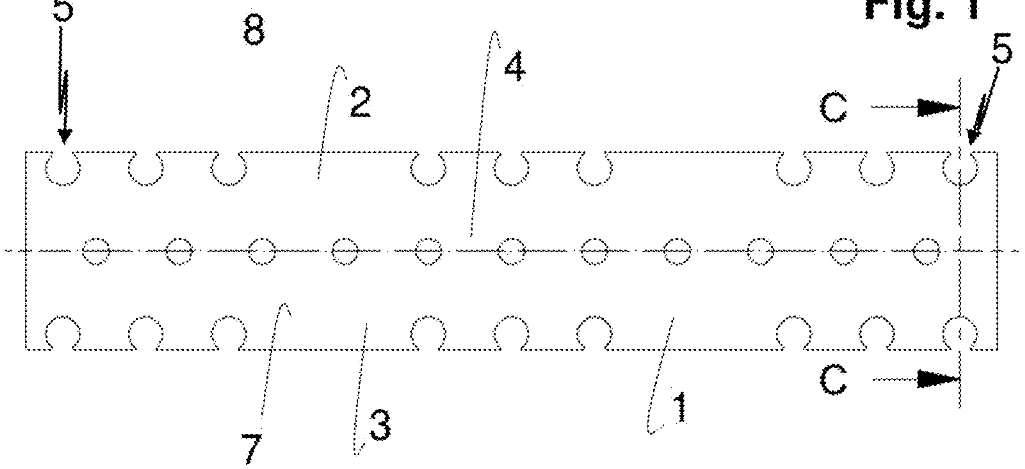
FIG. 2 is a top view of the sheet metal strip of FIG. 1.
Figure 3:
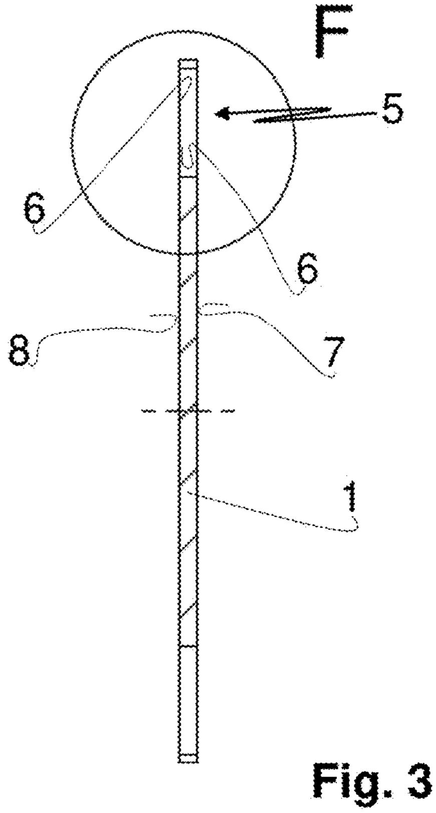
FIG. 3 is an enlarged side view of the sheet metal strip cut along the line C-C of FIG. 2.
Figure 4:
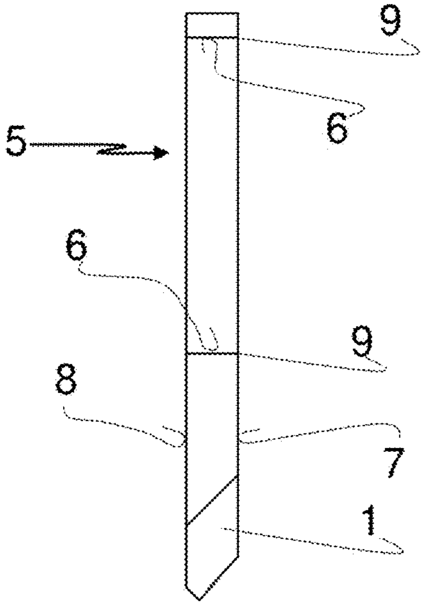
FIG. 4 is an enlarged view of the area marked with the letter F in FIG. 3.

FIGS. 1 to 4 show a sheet metal strip 1 for manufacturing a rolling element cage according to the invention in the form of a ball cage 21. The sheet metal strip 2 shown not only provides the starting material for the ball cage 21 according to the invention, but also illustrates the prior art.

The finished ball cage 21 is later formed from the sheet metal strip 1 by bending two receiving portions in the form of receiving legs 2, 3 opposite a connecting portion in the form of a cage back 4. Apertures 5 open towards the edge are provided in the receiving legs 2, 3 to accommodate the rolling elements in the form of bearing balls 16. The apertures 5 accommodate the bearing balls 16. The apertures 5 are open towards the edge of the sheet 1, but surround the balls by more than 180 degrees.

In the embodiment shown, the apertures 5 are punched into the sheet metal of the ball cage 21. As a result of the punching, the side surfaces 6 of the apertures and the top surfaces 7 and 8 are essentially at right angles to each other. This can be clearly seen in the enlarged view of FIG. 4. The right-angled edges of the apertures, where the side surfaces 6 intersect with the top surfaces 7, 8, are labelled by reference number 9.

It has been shown that such right-angled edges 9 lead to increased noise when the bearing balls 16 roll between the running surfaces of the first and second rail elements when the bearing balls 16 come into contact with these edges 9.

According to the invention, it is now provided to break these right-angled edges 9, to provide them with a chamfer or rounding them off. In the embodiment shown in FIGS. 1 to 4 and 7 to 16, the edges 9 are rounded. The transition between the side surface 6 of the aperture 5 and the top surface 7 comprises a rounding 10. In contrast, the embodiment shown in FIG. 17 has a linear chamfer 27 in the area of the transition between the side surface 6 of the aperture 5 and the top surface 7.

Figure 5:
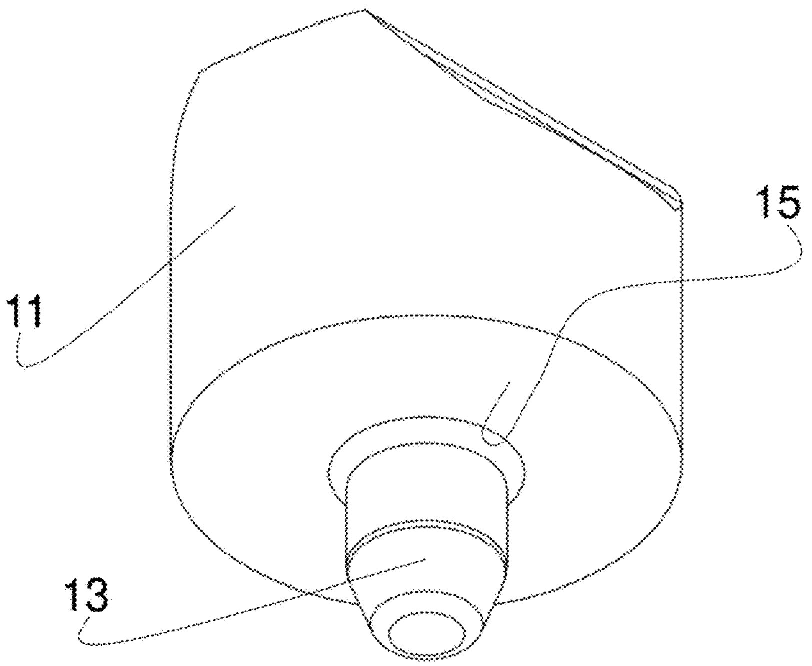
FIG. 5 is an isometric view of an embossing die.
Figure 6:
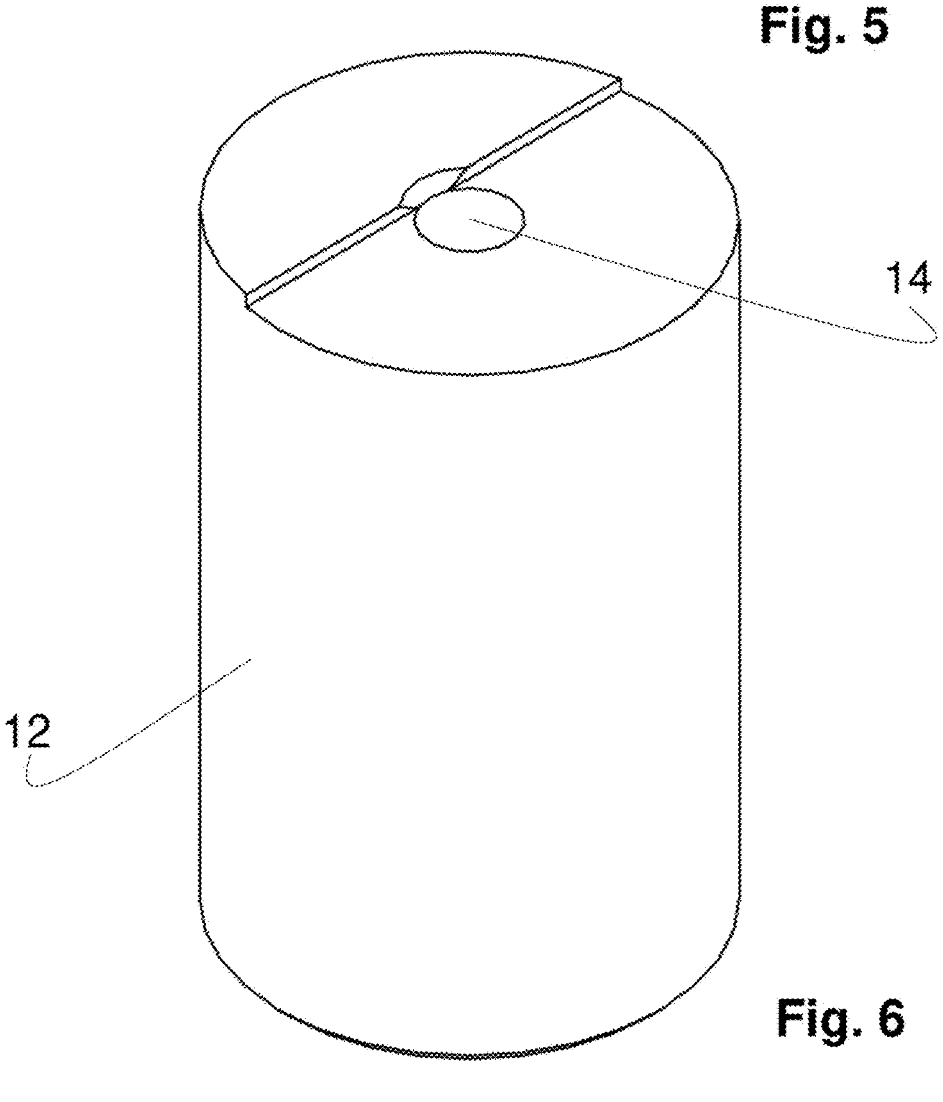
FIG. 6 is an isometric view of a mould complementary to the embossing die of FIG. 5.
Figure 7:
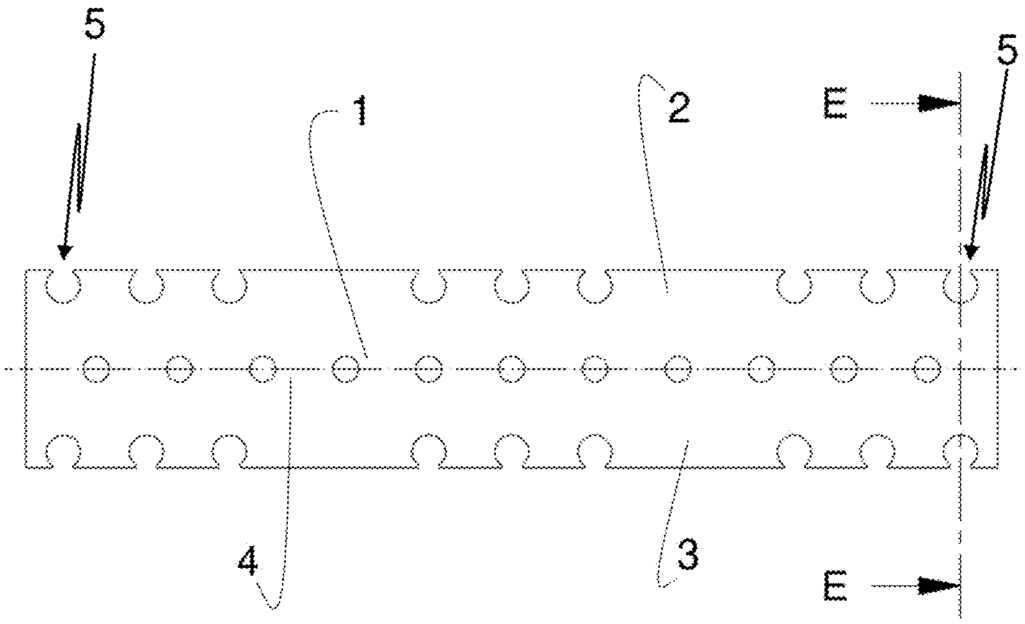
FIG. 7 is a top view of the sheet metal strip of FIGS. 1 to 4 after embossing.
Figure 8:
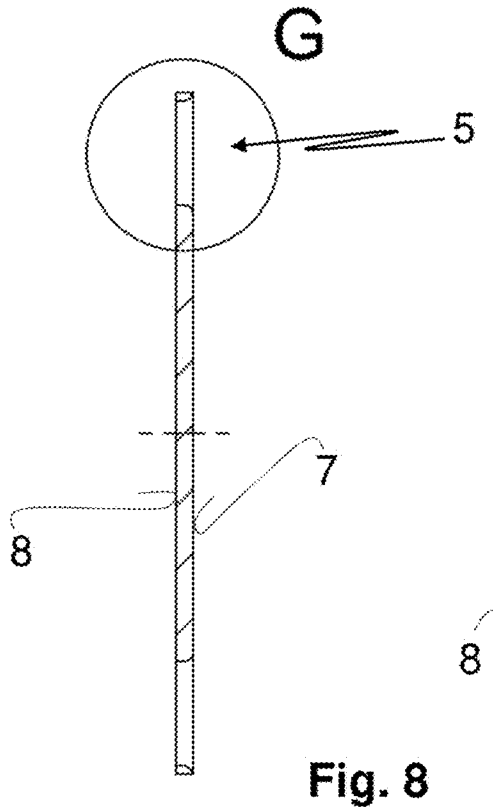
FIG. 8 is an enlarged side view of the sheet metal strip of FIG. 7, cut along the line E-E.
Figure 9:
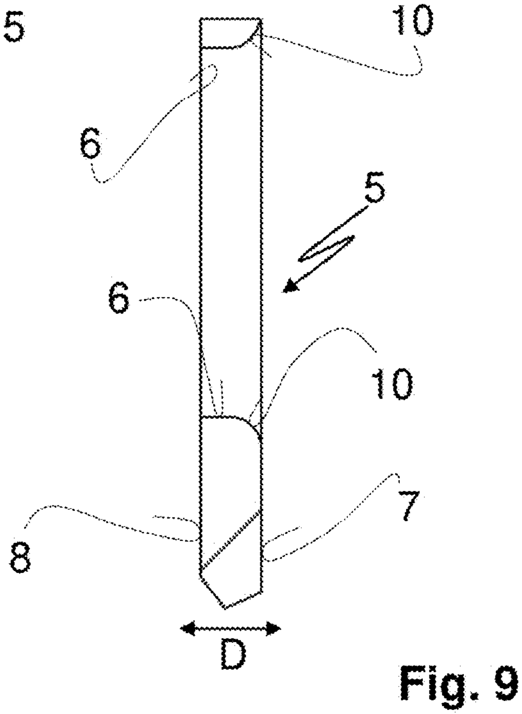
FIG. 9 is an enlarged view of the area marked with the letter G in FIG. 8.
Figure 10:
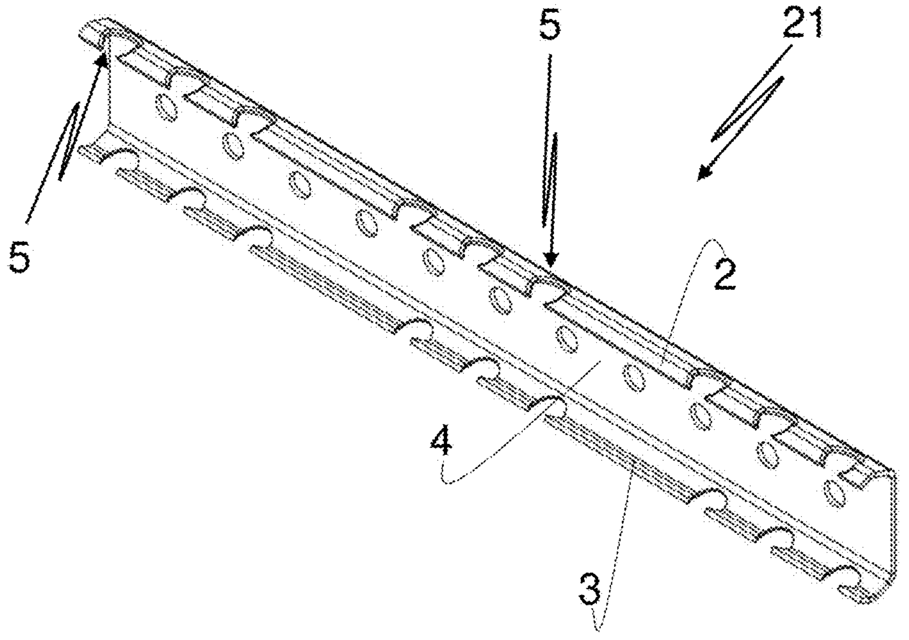
FIG. 10 is an isometric view of the ball cage after bending the sheet metal strip of FIGS. 7 to 9.
Figure 11:
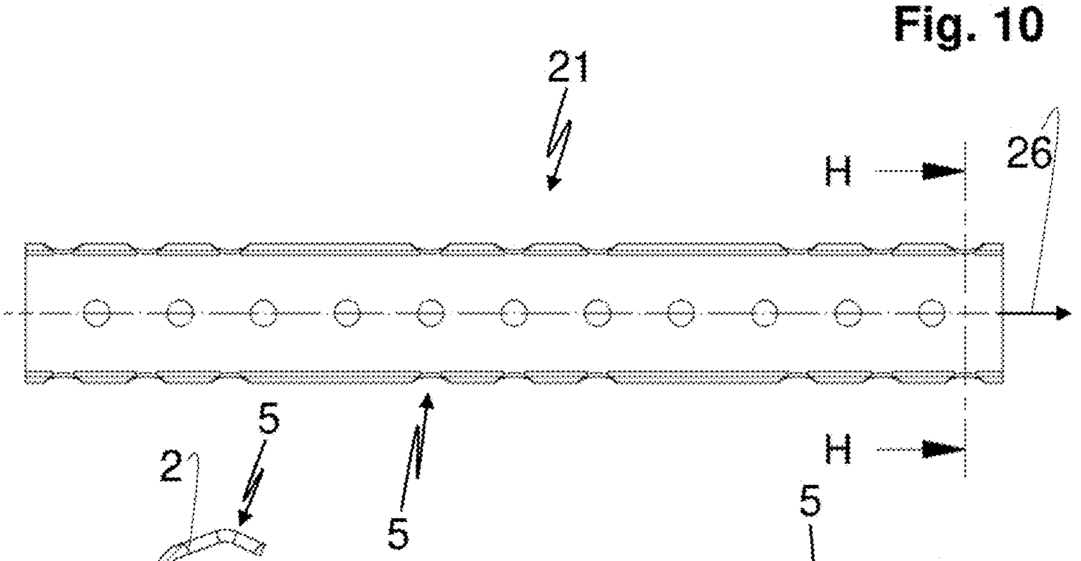
FIG. 11 is a top view of the ball cage of FIG. 10.

To form the rounding 10 of the embodiment of FIGS. 1 to 4 and 7 to 16, each aperture 5 is embossed with a tool, as shown in FIGS. 5 and 6, so that the rectangular shape of the edges 9 is replaced by a rounded shape in the transition between the top surface 7 and the side surface 6 of the aperture 5.

The tool comprises a punch 11 and a counter tool, i.e. a die 12. The punch is shown in FIG. 5, while the die 12 is shown in FIG. 6.

The punch 11 has a centring pin 13 to insert the punch 11 centred into a centring bore 14 of the die 12. The actual moulding embossing surface is designated in FIG. 5 by reference number 15. This embossing surface 15 is complementary to the rounding which the transition between the side surface 6 of the aperture and the top surfaces 7, 8 of the material of the ball cage 21 is to receive. In the embodiment shown, the embossing surface 15 is annularly concave-convex, so that the embossing surface 15 comprises a concave cross-section in each cross-sectional plane containing the axis of symmetry of the centring pin 13. During embossing, this concave cross-section leads to the convex shape of the transition between the side surface 6 and the top surface 7, which is clearly visible in FIGS. 8 to 13.

Figure 12:
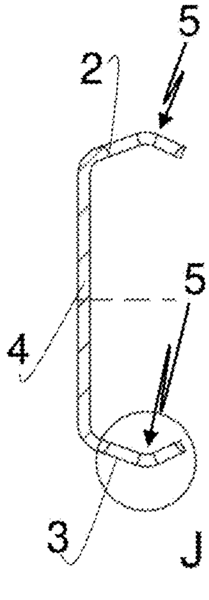
FIG. 12 is an enlarged side view of the ball cage of FIG. 11, cut along the line H-H.
Figure 13:
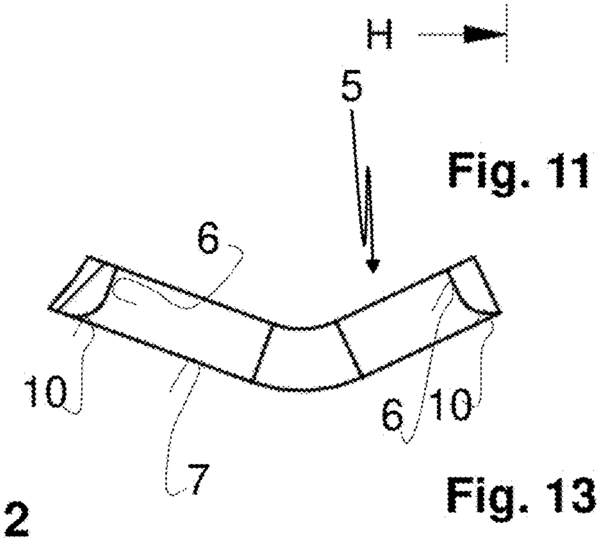
FIG. 13 is an enlarged view of the area marked with the letter J in FIG. 12.
Figure 14:
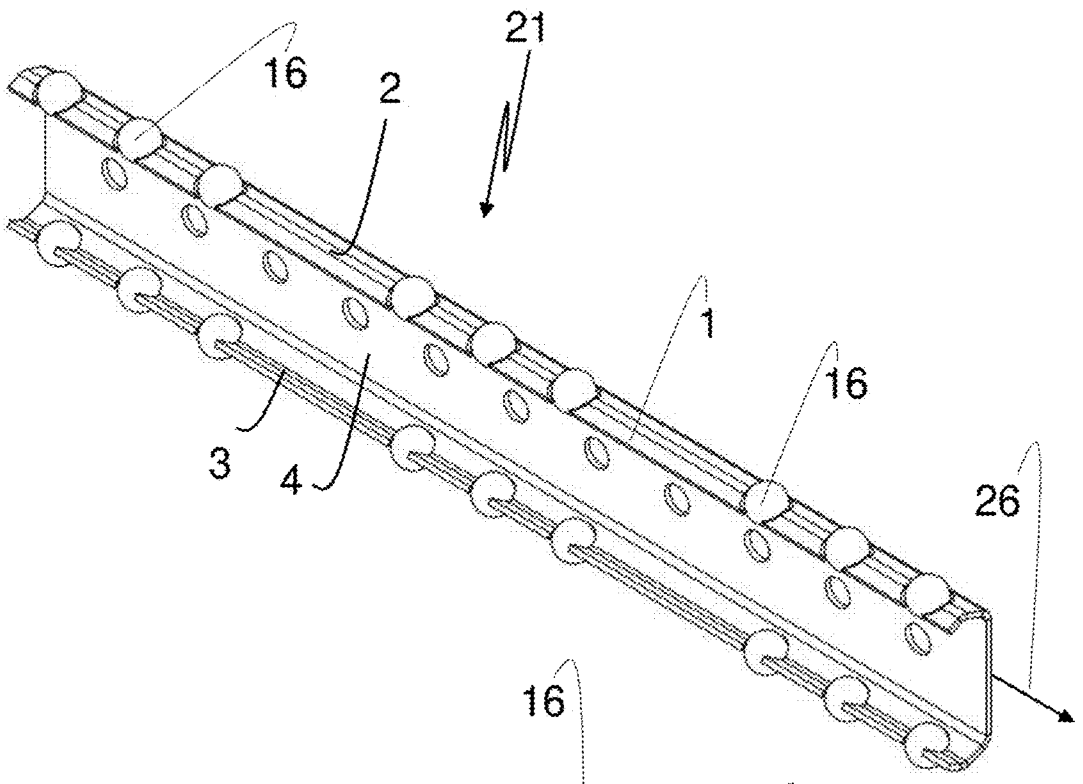
FIG. 14 is an isometric view of the ball cage of FIGS. 10 to 13 with bearing balls mounted on it.
Figure 15:
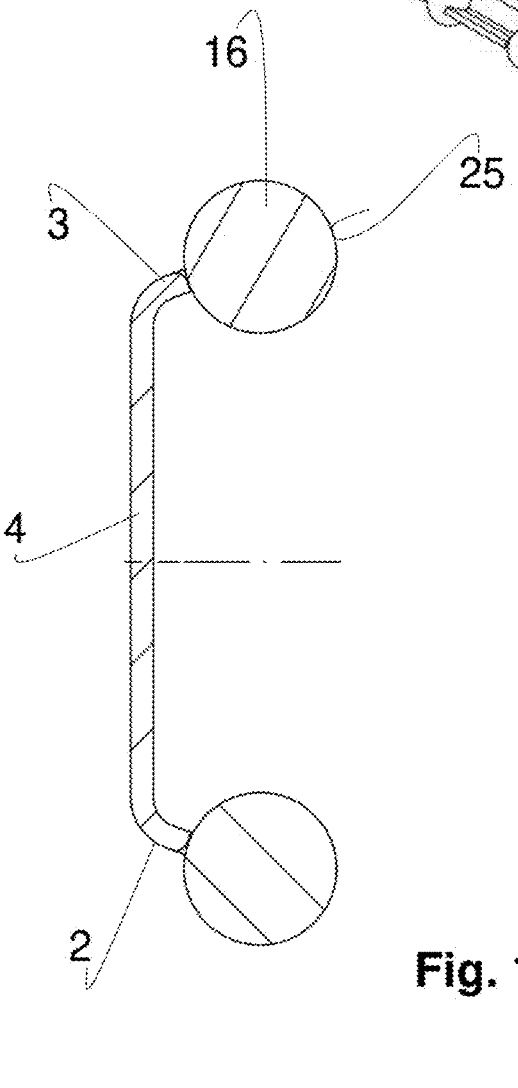
FIG. 15 is a sectional side view of the ball cage with the bearing balls along the line K-K of FIG. 14.

After embossing of each of the apertures 5 has been completed, the receiving legs 2, 3 are bent with respect to the ball cage back 4 so that the finished ball cage 21 shown in FIGS. 10 to 15 is formed. The enlarged illustrations in FIGS. 12 and 13 show the spherical shape of the apertures 5 between the top surface 7 and the side surface 6.

Figure 16:
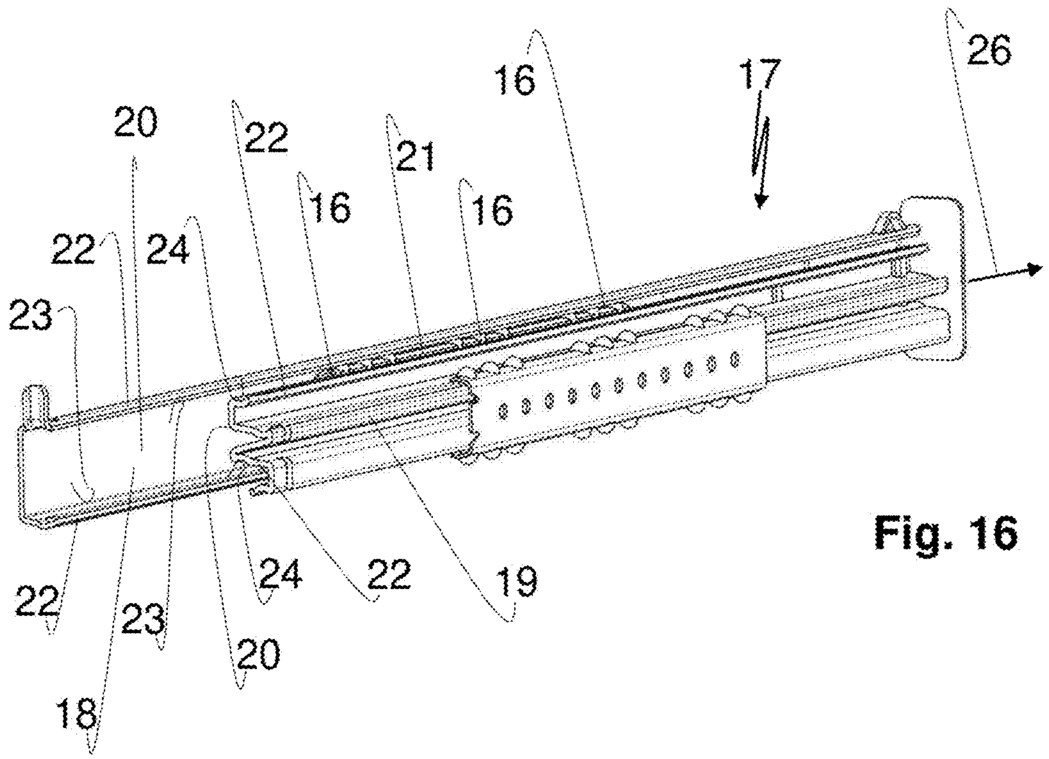
FIG. 16 is an isometric representation of a linear guide system comprising the ball cage and the bearing balls of FIGS. 14 and 15.
Figure 17:
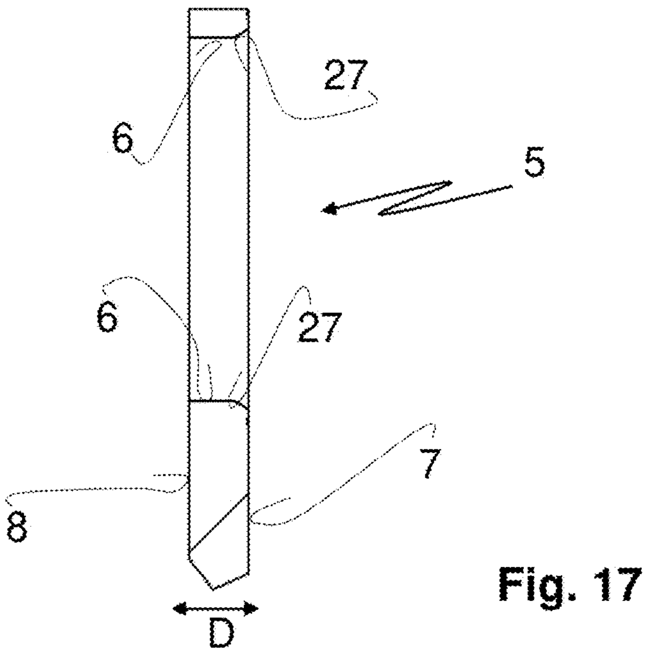
FIG. 17 is an enlarged view of an area of an alternative embodiment of the sheet metal, which is marked with the letter G in FIG. 8.

FIG. 16 shows the assembled linear guide system in the form of a telescopic rail 17, in which the ball cage 21 comprising the bearing balls 16 is installed. The telescopic rail 17 comprises a first rail element 18 and a second rail element 19. Each of the two C-shaped rail elements 18, 19 consists of a rail back 20, which connects two legs 22 to each other. The legs 22 are bent with respect to the respective rail backs 20. The legs 22 of the two rail elements 18, 19 each have running surfaces pointing towards each other. The running surfaces of the first rail element are referred to as first running surfaces 23 and the running surfaces of the second rail element are referred to as second running surfaces 24. During a relative movement of the first rail element 18 with respect to the second rail element 19, the bearing balls 16 roll between the first running surfaces 23 and the second running surfaces 24 of the two rail elements.

For the purposes of the original disclosure, it is pointed out that all features as they are apparent to a person skilled in the art from the present description, the drawings and the claims, even if they have been described specifically only in connection with certain further features, can be combined both individually and in any combination with other features or groups of features disclosed herein, unless this has been expressly excluded or technical circumstances make such combinations impossible or meaningless. A comprehensive, explicit description of all conceivable combinations of features is omitted here only for the sake of brevity and readability of the description.

Whilst the invention has been illustrated and described in detail in the drawings and the preceding description, this illustration and description is given by way of example only and is not intended to limit the scope of protection as defined by the claims. The invention is not limited to the disclosed embodiments.

Variations of the disclosed embodiments will be obvious to those skilled in the art from the drawings, the description and the appended claims. In the claims, the word "comprising" does not exclude other elements or steps, and the indefinite article "one" or "a" does not exclude a plurality. The mere fact that certain features are claimed in different claims does not exclude their combination. Reference numbers in the claims are not intended to limit the scope of protection.

LIST OF REFERENCE NUMBERS

1 Sheet metal strip
2, 3 Receiving leg
4 Cage back
5 Apertures
6 Side surface
7, 8 Top surface
9 Edge
10 Rounding
11 Punch
12 Die
13 Centre pin
14 Cylinder bore
15 Embossing surface
16 Bearing balls
17 Telescopic rail
18 First rail element
19 Second rail element
20 Rail back
21 Ball cage
22 Legs
23 First running surfaces
24 Second running surfaces
25 Ball surface
26 Pull-out direction
27 Chamfer

The invention claimed is:

1. A linear guide system comprising:

a first rail element comprising two first running surfaces;

a second rail element comprising two second running surfaces;

a rolling element cage comprising:

two receiving portions, wherein each of the two receiving portions comprises two extended top surfaces, and a plurality of apertures, wherein each aperture is a through hole through the two top surfaces, and wherein the outer extent of the through hole is a side surface connecting the two top surfaces, and a connecting portion connecting the two receiving portions, wherein a transition between one of the two top surfaces and the side surface comprises, at least in sections, a broken edge;

a plurality of bearing rolling elements; and a plurality of lubricant rolling elements, wherein the plurality of lubricant rolling elements comprises or consists of a solid lubricant, wherein at least one of the plurality of bearing rolling elements is receivable in one of the plurality of apertures of the rolling element cage, so that the side surface of the aperture or a transition between one of the two top surfaces and the side surface can be brought into contact with a rolling element surface of the bearing rolling element receivable in the aperture, wherein at least one of the plurality of lubricant rolling elements is receivable in one of the plurality of apertures of the rolling element cage, so that the side surface of the aperture or the transition can be brought into contact with a rolling element surface of the lubricating rolling element received in the aperture, wherein the rolling element cage positions the plurality of bearing rolling elements and the plurality of lubricant rolling elements between the first running surfaces of the first rail element and the second running surfaces of the second rail element, so that the first rail element and the second rail element are supported against each other in such a way that the first rail element and the second rail element are linearly displaceable relative to each other in and against a pull-out direction.

2. The linear guide system according to claim 1, wherein the solid lubricant is graphite.

3. The linear guide system according to claim 1, wherein the rolling element cage consists of sheet metal.

4. The linear guide system according to claim 1, wherein the rolling element cage is obtainable by a method comprising air blasting the rolling element cage with a solid blasting medium.

5. The linear guide system according to claim 1, wherein the rolling element cage is obtainable by a method comprising vibratory grinding of the rolling element cage.

6. The linear guide system according to claim 1, wherein the rolling element cage is obtainable by a method comprising embossing the transition between the side wall surface and the top surface with a forming tool, so that the broken edge comprises a rounding, wherein a course of the rounding is predetermined by a shape of the forming tool, or by a chip removing method.

7. The linear guide system according to claim 1, wherein the rolling element cage is manufactured from brass or bronze.

8. The linear guide system according to claim 1, wherein at least one of the plurality of bearing rolling elements is a bearing ball, wherein the bearing ball comprises a plurality of planes of symmetry, wherein the plurality of planes of symmetry include a straight line extending through the centre of the bearing ball and perpendicular to the pull-out direction, wherein the broken edge is either a chamfer that is straight in at least one of the plurality of planes of symmetry or a rounding that is curved in at least one of the plurality of planes of symmetry.

9. The linear guide system according to claim 1, wherein the rolling element cage comprises a thickness which is at least 5% of the radius of the bearing rolling element.

10. The linear guide system according to claim 1, wherein the rolling element cage is manufactured from a material comprising a smaller hardness than a material from which at least a plurality of the bearing rolling elements is manufactured.

11. The linear guide system according to claim 1, wherein the bearing rolling elements are made of a material comprising a larger hardness than the solid lubricant of the lubricant rolling elements.

12. A method for manufacturing a rolling element cage for a linear guide system comprising providing a material section, wherein the material section defines two receiving portions and a connecting portion of the rolling element cage connecting the two receiving portions, wherein each of the two receiving portions comprises two extended top surfaces, wherein the two receiving portions each comprise a plurality of apertures, wherein each aperture is a through hole through the two top surfaces, wherein the outer extent of the through hole is a side surface connecting the two top surfaces, and wherein a transition is formed between each of the two top surfaces and the side surface; and machining one of the transitions between one of the two top surfaces and the side surface so that the transition comprises, at least in sections, a broken edge, wherein the machining of the transition comprises at least one step selected from
air blasting the material section comprising a solid blasting medium,
vibratory grinding of the material section,
embossing the transition between the side wall surface and the top surface with a forming tool so that the broken edge comprises a rounding wherein a course of the rounding is predetermined by a shape of the forming tool, and
chip removing machining the transition between the side wall surface and the top surface.

13. The method according to claim 12, wherein providing the material section comprises the steps of
providing a strip from a metal sheet and
cutting or punching out the plurality of apertures.

14. The method according to claim 13, wherein after cutting out or punching out the plurality of apertures, the transition between the side wall surface and the top surface is embossed with a forming tool and after embossing, the receiving portions are bent relative to the connecting portion.

15. A method for manufacturing a rolling element cage for a linear guide system comprising
providing a material section, wherein the material section defines two receiving portions and a connecting portion of the rolling element cage connecting the two receiving portions, wherein each of the two receiving portions comprises two extended top surfaces, wherein the two receiving portions each comprise a plurality of apertures, wherein each aperture comprises a side surface connecting the two top surfaces, and wherein a transition is formed between each of the two top surfaces and the side surface; and
machining one of the transitions between one of the two top surfaces and the side surface so that the transition comprises at least in sections a broken edge,
wherein providing the material section comprises the steps of:
providing a strip from a metal sheet and
cutting or punching out the plurality of apertures, and
wherein after cutting out or punching out the plurality of apertures, the transition between the side wall surface and the top surface is embossed with a forming tool and after embossing, the receiving portions are bent relative to the connecting portion.

* * * * *